H. L. HOLT.
APPARATUS FOR PREPARING FOOD PRODUCTS.
APPLICATION FILED SEPT. 23, 1909.
969,955.
Patented Sept. 13, 1910.
3 SHEETS—SHEET 3.
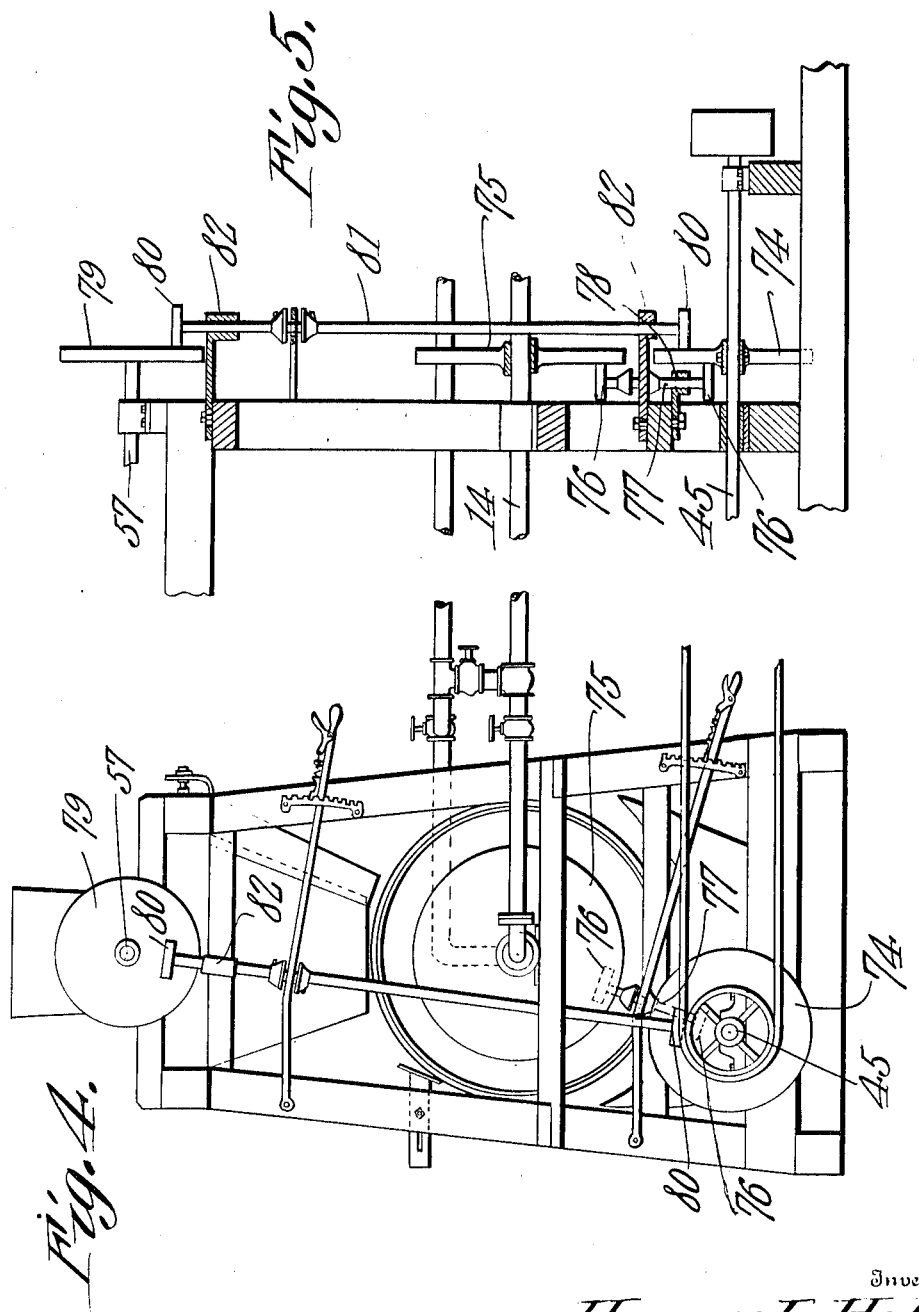

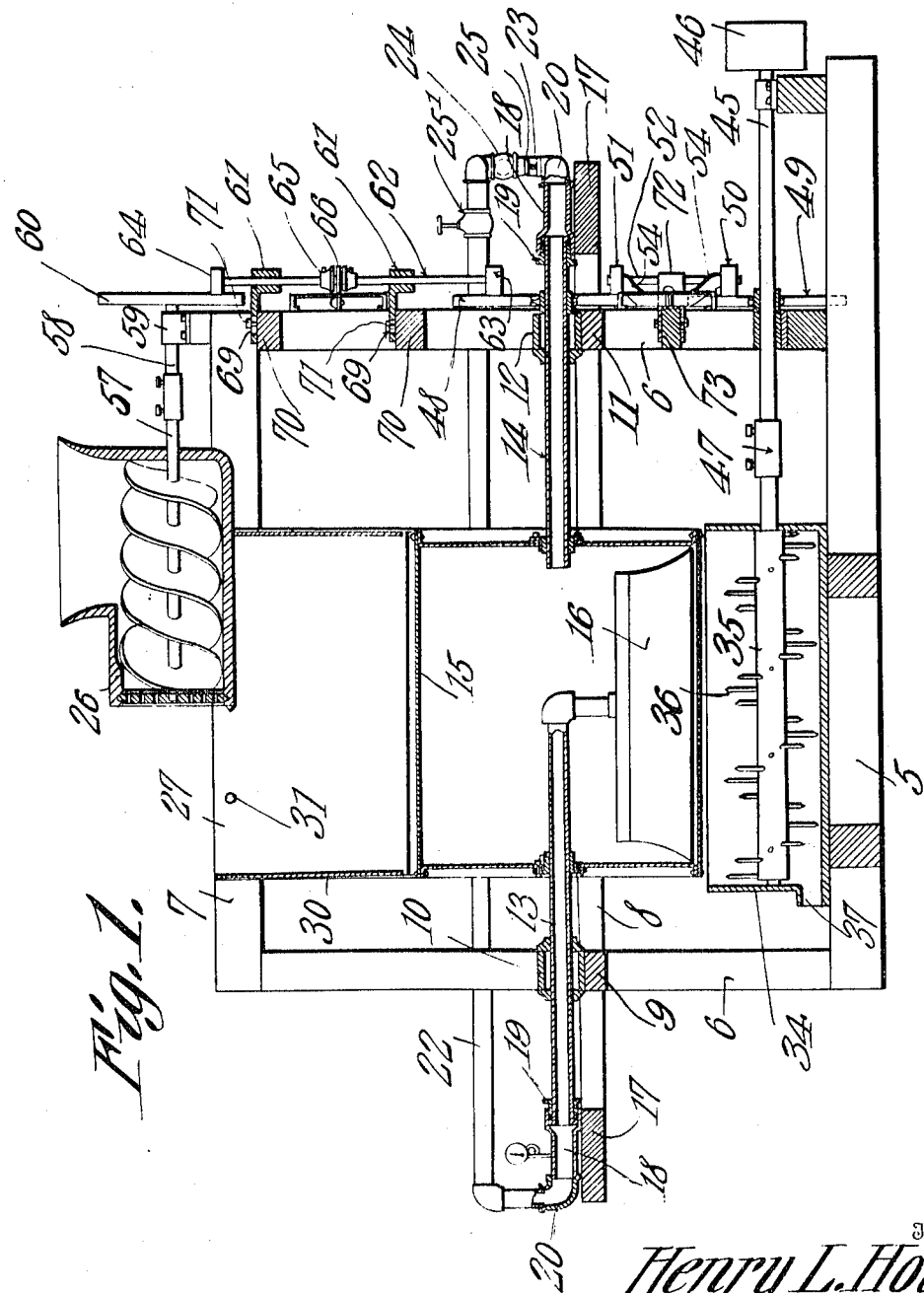

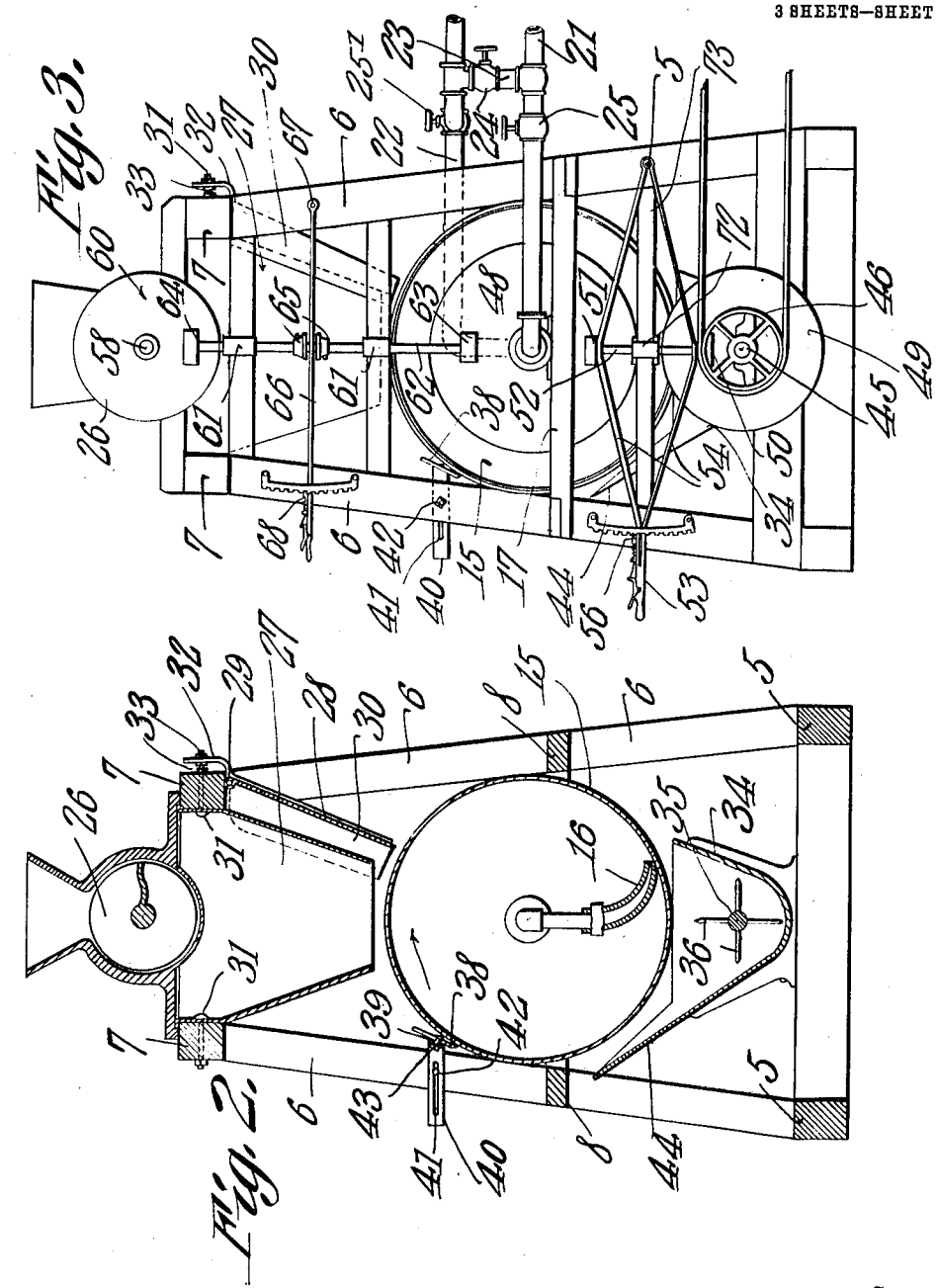

UNITED STATES PATENT OFFICE.

HENRY L. HOLT, OF CAMDEN, ARKANSAS.

APPARATUS FOR PREPARING FOOD PRODUCTS.

969,955.  Specification of Letters Patent.  Patented Sept. 13, 1910.

Application filed September 23, 1909. Serial No. 519,161.

*To all whom it may concern:*

Be it known that I, HENRY L. HOLT, a citizen of the United States, residing at Camden, in the county of Ouachita and State of Arkansas, have invented a new and useful Apparatus for Preparing Food Products, of which the following is a specification.

This invention relates to improvements in apparatus for preparing fruits, vegetables and other food products in which said products are first reduced to a comminuted state, and then dried by being discharged on the outer surface of a rotating steam heated cylinder, from which the dried substance drops into a conveyer which also reduces or breaks up the same to facilitate packing.

It is the object of the invention to provide improved means for preventing condensed steam from accumulating in the drying cylinder, and also means for evenly spreading the substance to be dried over the outer surface of the cylinder, said spreading means being adjustable to vary the thickness of the layer of substance being dried.

Another object is to provide improved means for supplying steam to the cylinder for the purpose of heating the same, and also to provide said cylinder with a variable speed driving mechanism, so that the speed may be adjusted according to the time required to dry the substance.

A still further object is to provide an improved device for breaking up the dried mass, and for conveying the finished product to a receptacle ready for packing.

With these and other objects in view as will be apparent when the nature of the invention is better understood, the same consists in a novel construction and arrangement of parts to be hereinafter described and claimed, reference being had to the drawings hereto annexed forming a part of this specification, in which the preferred embodiment of the invention is shown, it being understood that various changes in the form, proportions etc., of the various parts may be made, without a departure from the invention.

In the drawings, Figure 1 is a central longitudinal section of the apparatus. Fig. 2 is a transverse section on the line 2—2 of Fig. 1. Fig. 3 is an end view. Fig. 4 is an end view showing a modified form of gearing. Fig. 5 is a vertical section of said gearing.

Referring to the drawings, the supporting frame of the apparatus comprises longitudinal sills 5, from each of which rises a pair of uprights 6, the members of said pairs being connected at their upper ends by longitudinal beams 7, and intermediate their ends by longitudinal beams 8, the latter projecting at their ends a suitable distance beyond the uprights 6. At one end of the apparatus the uprights support a cross timber 9 on which is mounted a bearing box 10. The uprights at the other end of the frame support a similar cross timber 11 on which is also mounted a bearing box 12. In the bearing boxes 10 and 12 are journaled tubular shaft sections 13 and 14 respectively, said sections being in axial alinement, and connected to a hollow cylinder 15, the shaft sections extending thereinto. Each shaft section is connected to the cylinder by means of a flanged collar bolted to the respective cylinder heads and made fast to the sections, the shaft sections thus entering the cylinder through the heads thereof. The inner ends of the shaft section 13 carries a dipper 16 which extends close to the inner wall of the cylinder, and throughout the entire length thereof. The function of this dipper will be presently made clear.

The projecting ends of the beam 8 are connected by cross timbers 17 on which are mounted coupling members 18 for connecting the shaft sections 13 and 14 to a steam pipe. The shaft sections enter one end of the coupling members, said end being provided with a stuffing box 19 to prevent leakage. To the other end of the coupling members are connected elbows 20, by means of which connection with the steam pipe is made. Steam enters the cylinder 15 through the shaft section 14, and passes out of the same through the shaft section 13, it entering the last mentioned section by the way of the dipper 16. Condensed steam is scooped up by the dipper 16, and when it arrives in an upright position, the condensation is blown out of the same into the shaft section 13, this taking place at every revolution of the cylinder. It will be understood, of course, that the cylinder and dipper rotate with the shaft sections 13 and 14.

The pipe which supplies steam to the cylinder is indicated at 21, and the pipe which carries the steam from the cylinder at 22, said pipes being connected to the elbows 20 of the respective coupling members 18 as already described. The pipes 21 and 22 are connected by a by-pass 23 in which is located a valve 24. Between the by-pass and the outlet end of the pipe 21 is a valve 25, and between the by-pass and the inlet end of the pipe 22 is a valve 25'. These three valves are conveniently grouped.

The pipe 22 leads to the engine which drives the apparatus, the valves and by-pass being provided in order that the steam may pass directly to the engine without first passing through the cylinder. This is effected by closing the valves 25 and 25' and opening the valve 24. The engine may therefore be employed for running other machinery if the drying apparatus is not in use. If a sufficient quantity of steam to operate the engine when the apparatus is running does not pass through the cylinder, the by-pass valve 24 may be partly opened to supply additional steam direct to the engine.

At 26 is shown a device for grinding up or comminuting the product to be prepared. The structure of this device is immaterial to the present invention, and it may be one best suited for the purpose. The grinding device is mounted on the beams 7, and discharges into a hopper 27 located above the cylinder 15, the discharge end of the hopper being contracted and located in close proximity to the outer surface of the cylinder, and extending the entire length thereof. The material issuing from the grinder drops into the hopper 27, and is discharged onto the cylinder. On one side of the hopper is located a device for spreading the material evenly over the cylinder. Said device comprises a plate, 28 which is hinged at 29 to one of the beams 7, and has at its ends outstanding flanges 30 overlapping the ends of the hopper. The lower edge of the plate extends parallel to the axis of the hopper and throughout the entire length thereof. The hopper is secured to the beams 7 by bolts 31, and one of the bolts extends from the front of one of the beams 7 sufficiently to pass through an opening in a stem 32 projecting from the upper end of the plate 28. Nuts 33 screwed on the bolt on opposite sides of the stem hold the plate 28 at adjustment, and upon loosening said nuts, the plate may be swung on its pivot and brought closer to or farther from the outer surface of the cylinder, thereby regulating the thickness of the layer of substance thereon.

Below the cylinder 15 is mounted a trough 34 to receive the dried substance as it drops off the cylinder. This trough contains a conveyer comprising a shaft 35 armed with radially extending spikes or teeth 36 which are set spirally so as to work the material to the discharge spout 37 of the trough under which a suitable receptacle may be placed to receive the same. The spikes 36 also serve to cut up the dried substance, and the same is thus prepared ready for packing.

At 38 is indicated a scraper blade for removing any of the substance tending to cling to the cylinder. The blade extends the entire length of the cylinder and is carried by a bar 39 having laterally presented ends 40 which are slotted as indicated at 41, and secured to the uprights 6 by bolts 42 passing through the slot into said uprights, the slots permitting adjustment of the blade toward or from the surface of the cylinder, as well as angular adjustment. The blade is slotted and is secured to the bar 39 by bolts 43 passing through said bar and through the slots.

The scraper 38 and the plate 28 are located on opposite sides of a perpendicular line passing through the axis of the cylinder, and the latter rotates in the direction of the arrow displayed in Fig. 2, by reason of which the material as it drops on the cylinder is spread out in an even layer by the plate 28 and is then carried by the cylinder downwardly and around to the trough 38 into which it drops. If any of the material sticks to the cylinder it will be scraped off by the blade 38, and in order that it may drop into the trough after being thus scraped off, said trough has on one side an outwardly extending lip 44 on which the scraped off material drops and by which it is conducted into the trough. The plate 28 may be set so as to spread the substance into a layer of the desired thickness, the object being to so spread out the substance that it will be perfectly dried when it reaches the trough 34 or the scraper 38. Adjustment of the plate 28 may be made according to the nature of the substance to be treated, the speed of rotation of the cylinder, and the degree to which it has been heated.

It is obvious that the longer the space of time in which moisture is evaporating from the food mass, the greater the danger of bacterial attacks and unwholesome chemical actions setting up, and a consequent deterioration of the article to that extent. In drying the food mass by the apparatus herein described there is no danger of the substance becoming tainted or deteriorated as the drying process is rapid and uniform.

At 45 is indicated the drive shaft of the apparatus, it being provided with a pulley 46 which is belted to the engine. The shaft is connected by a coupling 47 to the shaft 35 of the conveyer.

On the shaft section 14 is made fast a friction disk 48, and on the drive shaft 45 is a friction disk 49. The motion of the friction disk 49 is communicated to the friction disk 48 by friction wheels 50 and 51 respectively mounted on a shaft 52, the wheel 50 being in engagement with the disk 49, and the wheel 51 with the disk 48. The shaft 52 is carried by a hand lever 53 having two branches 54 provided with bearings in which the shaft is journaled, and the branches of the lever are brought together and pivoted at 55 to one of the uprights 6. A suitable locking device 56 for holding the lever at adjustment is provided.

The shaft 57 of the grinder 26 is coupled to a shaft 58 mounted in a bearing 59 supported on the beams 7. On the shaft 58 is a friction disk 60. Mounted in bearings 61 is a shaft 62 carrying friction wheels 63 and 64 respectively, the former being in engagement with the disk 48, and the latter with the disk 60, whereby the motion of the disk is transmitted to the disk 60. To the shaft 62 are made fast collars 65 which are engageable by a hand lever 66 pivoted at 67 to one of the uprights 6. This lever is also provided with a suitable locking device 68 for holding it at adjustment.

The levers 53 and 66 are provided for the purpose of shifting the two sets of friction wheels on the friction disks and thus varying the speed of rotation of the cylinder and the grinding mechanism. The speed may therefore be readily adjusted according to the nature of the substance to be dried. The gearing also enables the speed of the grinder and the cylinder to be varied independent of each other, so that one may be run faster or slower than the other, and vice versa.

The bearings 61 have slotted flanges 69 whereby they are bolted to cross timbers 70 mounted between the uprights 6. The bolts 71 pass through the slots which permits the bearings to be adjusted to take up wear of the friction wheels 63 and 64. The shaft 52 is supported in a bearing 72 mounted in the same manner as the bearings 61 on a cross timber 73 extending between the uprights 6, in order that adjustment for the purpose of taking up wear of the friction wheels 50 and 51 may also be made.

In Figs. 4 and 5 is shown a modified form of gearing for transmitting motion to the grinder and cylinder. On the drive shaft 45, and the shaft section 14, are mounted friction disks 74 and 75, respectively, as before. Motion is transmitted from the disk 74 to the disk 75, by friction wheels 76 carried on a shaft 77 journaled in an adjustable bearing 78, similar to the bearing 61, and mounted in the same manner. On the shaft 57 of the grinder is a friction disk 79. This disk is driven directly from the disk 74 by friction wheels 80, mounted on a shaft 81, journaled in bearings 82, similar to the bearing 78. Suitable hand levers, as shown, are provided for shifting the friction wheels on the surface of the disks to vary the speed. In order that the shafts of the two sets of friction wheels may operate without interfering with each other, the shaft 77 is so placed that the friction wheels 76 engage the rear surface of the friction disks 74 and 75, and the shaft 81 is so placed that the friction wheels 80 engage the front surface of the disks 74 and 79. The shaft 81 is also set so as to clear the shaft section 14, which necessitates moving the trough 38 to one side as shown in Fig. 4. By the gearing last described, the cylinder and the grinder are driven independently from the friction disk 74, and the speeds therefore can be varied without one interfering with the other.

What is claimed is:

1. In an apparatus of the class described, a rotary hollow cylinder, tubular shafts entering said cylinder through the heads thereof, said shafts being in axial alinement, supports for the shafts, driving means connected to one of the shafts, a steam pipe connected to one of the shafts whereby steam is discharged into the cylinder, the other shaft serving as an outlet for the steam from the cylinder and being rotatable with the cylinder, and a dipper connected the last-mentioned shaft within the cylinder, said dipper being in communication with the bore of the shaft, and extending at its inlet end along the inner wall of the cylinder.

2. In an apparatus of the kind stated, a rotary drying cylinder, a hopper discharging onto the surface of the cylinder, a rotary grinder discharging into the hopper, and a variable speed driving mechanism for the cylinder and the grinder.

3. In an apparatus of the kind stated, a rotary drying cylinder, a hopper discharging onto the surface of the cylinder, a rotary grinder discharging into the hopper, and independent variable speed driving mechanisms for the cylinder and the grinder.

4. In an apparatus of the class described, a rotary drying cylinder, a hopper discharging onto said cylinder, a plate located adjacent the discharge end of the hopper, said plate being pivoted, and having at its ends outstanding flanges overlapping the ends of the hopper, and the lower edge of the plate extending parallel to the axis of the cylinder, and means for swinging the plate on its pivot to vary the distance between its lower edge and the surface of the cylinder.

5. In an apparatus of the kind stated, a rotary drying cylinder, a rotary grinder for the material to be discharged onto the surface of the cylinder, and a variable speed driving mechanism for the cylinder, and between the cylinder and the grinder.

In testimony that I claim the foregoing as my own, I have hereto affixed my signature in the presence of two witnesses.

HENRY L. HOLT.

Witnesses:
T. B. BEARD,
W. N. MERRITT.